United States Patent
Phillips et al.

(10) Patent No.: US 7,052,265 B2
(45) Date of Patent: May 30, 2006

(54) DEVICE TO SIMULTANEOUSLY MANIPULATE CURLING SCREWS OF A LIP ROLLING MACHINE

(75) Inventors: Robert A. Phillips, Beaverton, MI (US); Christopher J. Phillips, Gladwin, MI (US)

(73) Assignee: Future Mold Corporation, Farwell, MI (US)

( * ) Notice: Subject to any disclaimer, the term of this patent is extended or adjusted under 35 U.S.C. 154(b) by 164 days.

(21) Appl. No.: 10/852,281

(22) Filed: May 24, 2004

(65) Prior Publication Data

US 2005/0013894 A1 Jan. 20, 2005

Related U.S. Application Data

(60) Provisional application No. 60/487,033, filed on Jul. 14, 2003.

(51) Int. Cl.
*B29C 53/34* (2006.01)
(52) U.S. Cl. ............... 425/188; 425/329; 425/334; 425/384; 425/392; 264/297.4

(58) Field of Classification Search ............... 425/182, 425/188, 329, 334, 391–392, 384; 264/297.4, 264/296, 297.8
See application file for complete search history.

(56) References Cited

U.S. PATENT DOCUMENTS

| | | | |
|---|---|---|---|
| 3,337,919 A | | 8/1967 | Brown |
| 3,579,737 A | * | 5/1971 | Gerber et al. ............ 425/394 |
| 3,914,102 A | | 10/1975 | Brown |
| 4,235,579 A | * | 11/1980 | Kurz et al. ............ 425/398 |
| 6,129,537 A | | 10/2000 | Merz |
| 6,135,754 A | | 10/2000 | Lamson |
| 6,164,949 A | | 12/2000 | Lamson |

\* cited by examiner

*Primary Examiner*—Duane Smith
*Assistant Examiner*—Thu Khanh T. Nguyen
(74) *Attorney, Agent, or Firm*—Robert L. McKellar; McKellar IP Law, PLLC (57) ABSTRACT

Devices that have the capability to simultaneously manipulate the curling screws of a lip rolling machine while it is in operation and lip rolling machines so modified.

12 Claims, 8 Drawing Sheets

DEVICE TO SIMULTANEOUSLY MANIPULATE CURLING SCREWS OF A LIP ROLLING MACHINE

This application claims priority from Provisional Patent Application 60/487,033, filed on Jul. 14, 2003.

BACKGROUND OF THE INVENTION AND PRIOR ART

This invention deals with devices that have the capability to simultaneously manipulate the curling screws of a lip rolling machine while it is in operation and lip rolling machines so modified.

Lip rolling machines are well-known in the prior art and initially were developed during the late 1960's and early 1970's into modern manufacturing equipment. Such devices are used for folding lips or rims of plastic containers operating on a single plastic container delivered from a stack or nest of containers provided to the device. The major component of such devices are the lip rollers and the lip rollers consist of a series of parallel or nearly parallel helical screws having the capability of providing a spiral rim folding maneuver for the containers. Each of the screws has spiral rim folding grooves on the surface for receiving containers having pre-heated lip areas. The rim folding roller is angularly offset relative to the axis of the stack or nest of such containers, such that the portions of the grooves receiving the rims lie in planes perpendicular to the axis of the stack.

One of the earliest devices is disclosed in U.S. Pat. No. 3,337,919, that issued on Aug. 29, 1967 to Brown in which there is described an apparatus for curling the rims or flanges of plastic containers using a plurality of circumferentially spaced forming members, wherein one of the forming members comprises a driven rotatable roll having a rim curling spiral groove adapted to accommodate therein the rims or flanges of the containers (the lip rolling screw), and the other forming members comprising generally smooth surface crowding members maintaining the flange or rim in the groove under such force as to effect conjoint rotation and relative axial movement of the container and the groove-forming member. This prior art device does not have the capacity to manipulate the curling screw while the device is operating.

In another, related patent, U.S. Pat. No. 3,914,102 to Brown, that issued on Oct. 21, 1975 another device is described. It should be noted that the Brown device as described in this patent also does not have the capacity to manipulate the curling screws while the device is running.

In a more recent series of patents, there exists U.S. Pat. No. 6,129,537 that issued on Oct. 10, 2000 to Merz, in which there is described for the first time, a means of adjusting the lip rolling screws. Although this device provides a means for adjusting the lip rollers essentially simultaneously, this can only be accomplished while the device is stopped and not while the equipment is in operation.

In addition, two U.S. patents that issued to Lamson, one, U.S. Pat. No. 6,135,754 that issued on Oct. 24, 2000 and the second, U.S. Pat. No. 6,164,949, that issued on Dec. 26, 2000 disclose devices that allow for the simultaneous manipulation of roller screws while the devices are in operation. Both devices depend on the use of separate systems of slide and common linkages which are described therein as ". . . a plurality of curling screws arranged about a circular space about a center axis, each curling screw rotated to carry out said forming, each curling screw formed with a helical groove engaging said container rim and progressively forming a lip as said container is axially advanced between said curling screws by rotation thereof; a mount for each curling screw for enabling selective adjusting movement causing a selective increase or decrease of the radius of said spacing circle to enable adaptation to different sized containers; said mounting including means for constraining simultaneous radical adjustment movement of said curling screws together while maintaining the location of said center axis of said spacing circle and a selectively operable adjuster acting on all of said curling screws simultaneously to cause said simultaneous movement . . . ", wherein, ". . . said curling screw mounting comprises a series of pivoted mounting plates each carrying a respective curling screw, said series of mounting plates linked together by a linkage system to pivot in unison with each other."

U.S. Pat. No. 6,135,754 describes a three roller device, and the U.S. Pat. No. 6,164,949 describes a four roller apparatus, the more common device used today in manufacturing.

THE INVENTION

What is disclosed and described herein is a novel means for simultaneously adjusting the roller screws of a lip rolling machine while the machine is in operation. This is accomplished by a series of pocket cassettes associated with each roller screw wherein each pocket cassette is configured such that is can be controlled precisely, and simultaneously by one mechanism while the lip rolling machine is operating. The control mechanism is controlled by a gear box and a single cam plate, while the movement of the pocket cassettes is accomplished by a series of pulleys and a single drive belt wherein the drive belt is driven by a motorized pulley and controlled by an adjusting mechanism.

By this means, the curling screws can be moved to fit different sized containers being fed to the lip rolling machine while the machine is in an operating condition.

Therefore, in some further detail, this invention deals with an adjustable curling screw mechanism for a lip rolling machine adapted to form a rolled lip on the rim of a container by means of the curling screw mechanism.

The curling screw mechanism comprises a plurality of curling screws arranged about a circular space about a center axis, each curling screw rotated to carry out the forming, wherein each curling screw is formed with a helical groove engaging the container rim and progressively forms a lip as the container is axially advanced between the curling screws by rotation of the screws.

There is a mounting for each curling screw for enabling selective adjusting movement causing a selective increase or decrease of the radius of said spacing circle to enable adaptation to different sized containers.

There is a mounting that includes means for causing simultaneous radial adjusting movement of the curling screws together while maintaining the location of the center axis of the spacing circle. In addition, there is a selectively operable adjuster acting on all of the curling screws simultaneously to cause the simultaneous movement of the curling screws.

The curling screw mechanism comprises a curling screw mounting comprising a series of pocket cassettes as a carrier for each respective curling screw, each pocket cassette having surmounted thereon a rotatable pulley and a perpendicular roller bearing pin. The series of pocket cassettes are linked together by a single drive belt associated with each rotatable pulley to provide a drive means for each curling screw in association with a motorized drive pulley.

The operable adjuster for the curling screws comprises a single circular cam plate having an outer edge, a center axis, a large centered opening, and a plurality of configured semi-circular openings through the cam plate. The circular cam plate is rotatably held in place by a plurality of rotatable support pulleys at the outer edge of the cam plate such that each perpendicular roller bearing pin of each pocket cassette is moveably held in a configured opening.

The cam plate has a back surface and a lower edge, and attached to the back surface near the lower edge is a channeled track. The channeled track has a configured bottom in the channel that enables it to accommodate the drive wheel of a drive mechanism.

The drive mechanism comprises a gear box containing a gear drive mechanism, the gear drive mechanism having a shaft driven by the drive mechanism. The shaft has a distal end and affixed to the distal end of the shaft is a drive wheel, the drive wheel having an outside edge, the outside edge having a configuration that is accommodated by the configuration in the bottom of the channel of the track such that the wheel moves in the track and moves the circular cam plate accordingly. The shaft is typically horizontally mounted. There is a means for adjusting the tautness of the single drive belt that links the pocket cassettes.

Another embodiment of the invention is the use of a braking system on the slidable pocket cassette and yet another embodiment of the invention is the use of a measuring device to track and maintain the settings of the curling screws after they are adjusted.

Another embodiment of the invention is the use of the device on a lip rolling machine.

There is a system of curling screw machines that are interchangeable with each other. The cassette is quickly removed while another is set in its place to accommodate different ranges within family sizes.

Also in place is the ability to independently change the diameter of either the feed end or the finished end. Also these ends do not have to have a diameter of equal distance; one can be greater or smaller than the other.

DETAILED DESCRIPTION OF THE INVENTION

Figure 1:
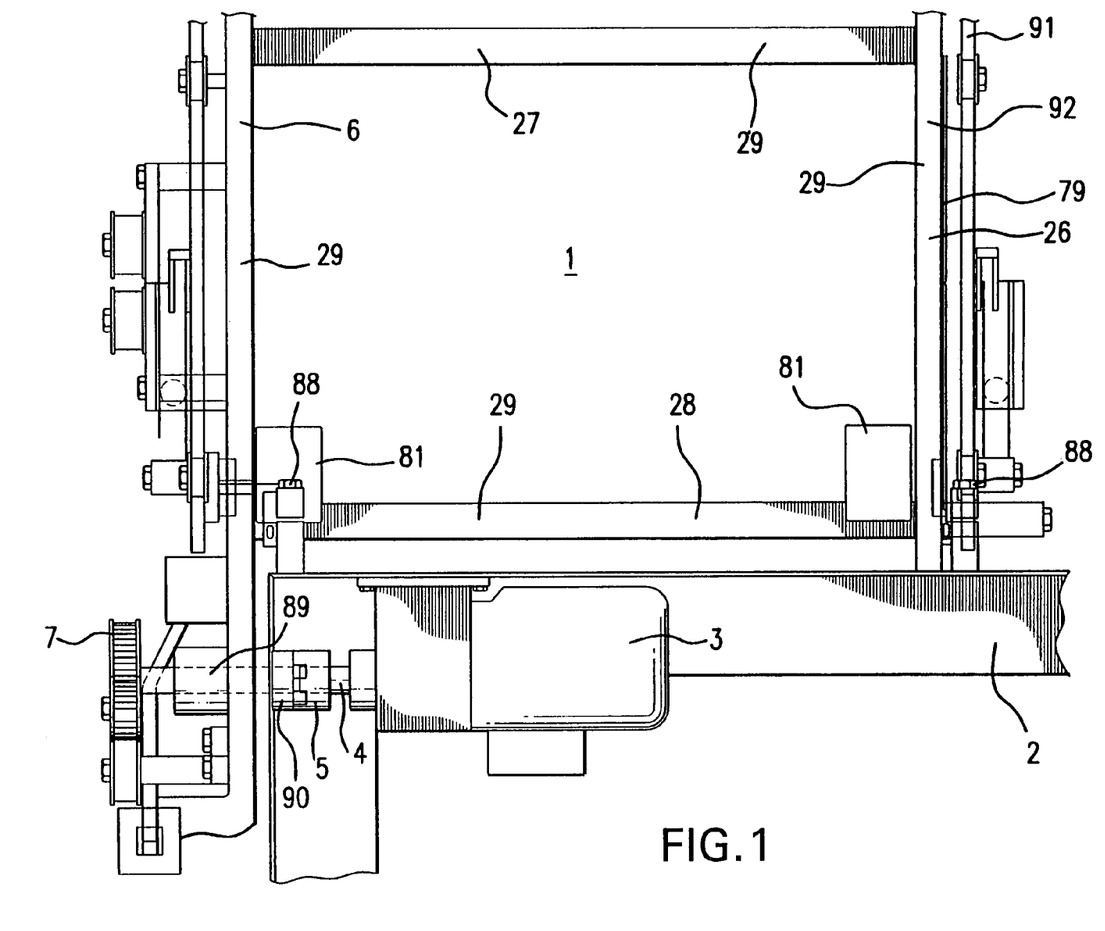
FIG. 1 is a full side view of a lip rolling machine of this invention mounted on a support stand which only a portion thereof is shown.

Turning to FIG. 1, wherein there is shown a full side view of a lip rolling machine 1 of this invention sitting on the top surface of a support stand 2 wherein only a portion of the support stand 2 is shown. For purposes of a description of this invention and to help provide clarity around the invention, the usual ovens and auxiliary equipment have not been shown. Shown on the support stand 2 is a support frame 29 having an exit plate 6 as one end, a delivery end plate 26 as the opposite end, and top rails 27 and bottom rails 28. Also present is the heat shield 79 located between the delivery end plate 26 and cammed plate 33. Cam plate gear boxes 81 are located just inside each bottom corner of support frame 29. The cam plate gear box adjusts the cam plate and displays the movement. The quick disconnect fasteners 88 located inside the support frame 29 allow the entire lip rolling cassette 1 to be removed easily. The quick disconnect fasteners 88 are loosened allowing the entire lip roller cassette 1 to be removed and another lip roller cassette unit can easily be fastened into place.

Shown mounted underneath the support stand 2 is a drive motor 3 for the lip rolling machine 1, which is shown as a direct drive to the lip rolling mechanism described infra, through a drive shaft 4 and coupling unit 5. There is also shown a exit mounting plate 6, through which the main pulley drive shaft 89 connected to the main drive shaft pulley coupling 90 passes to the outside of the machine, and to which there is mounted a main drive pulley 7 that will accommodate a single drive belt 8, shown in FIGS. 2 and 3, for example.

Figure 2:
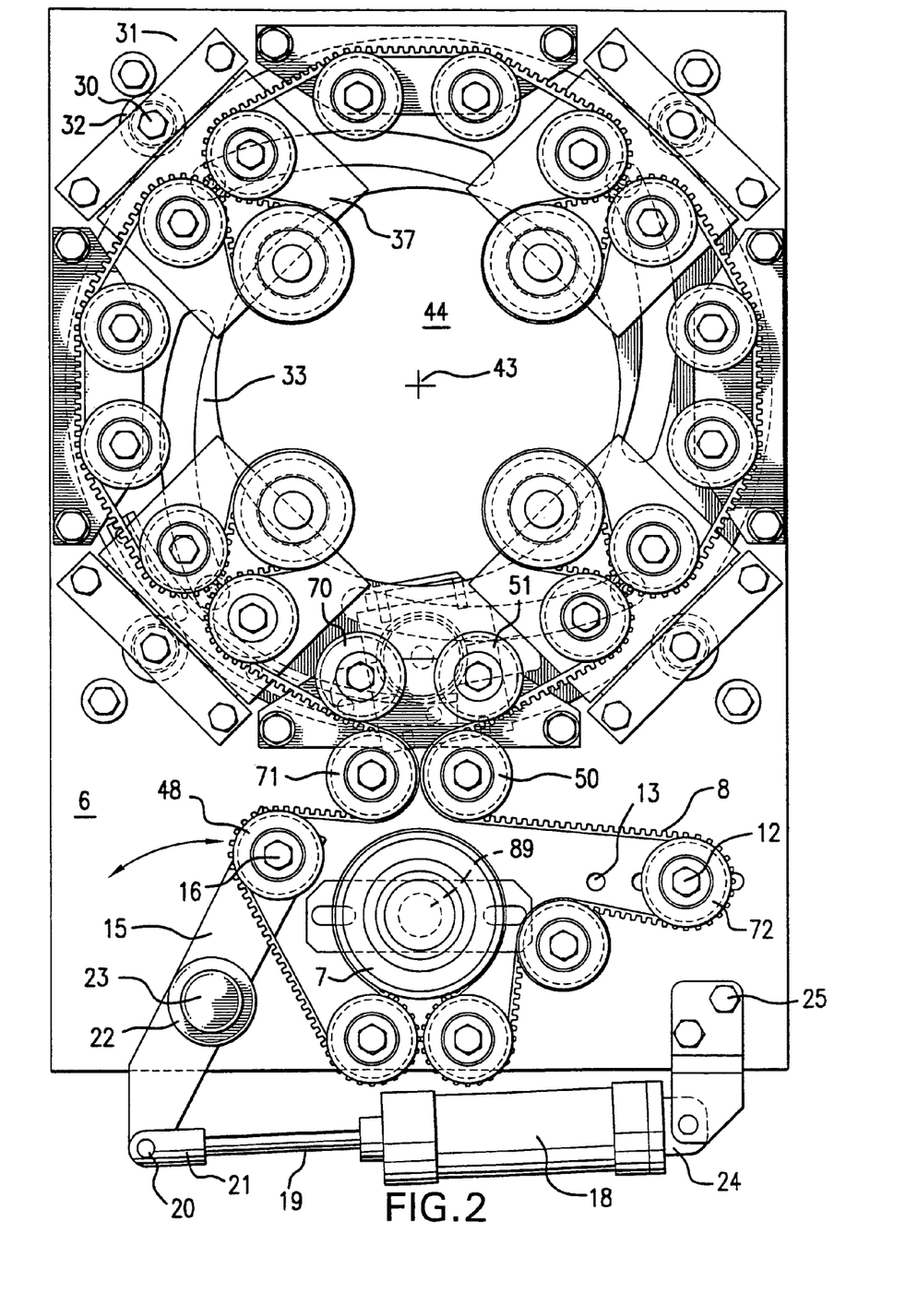
FIG. 2 is a full front view of a drive end of a lip rolling machine equipped with a device of this invention in a fully open position that leaves the lip rolls the greatest distance from the centered axis of the curling screws.
Figure 3:
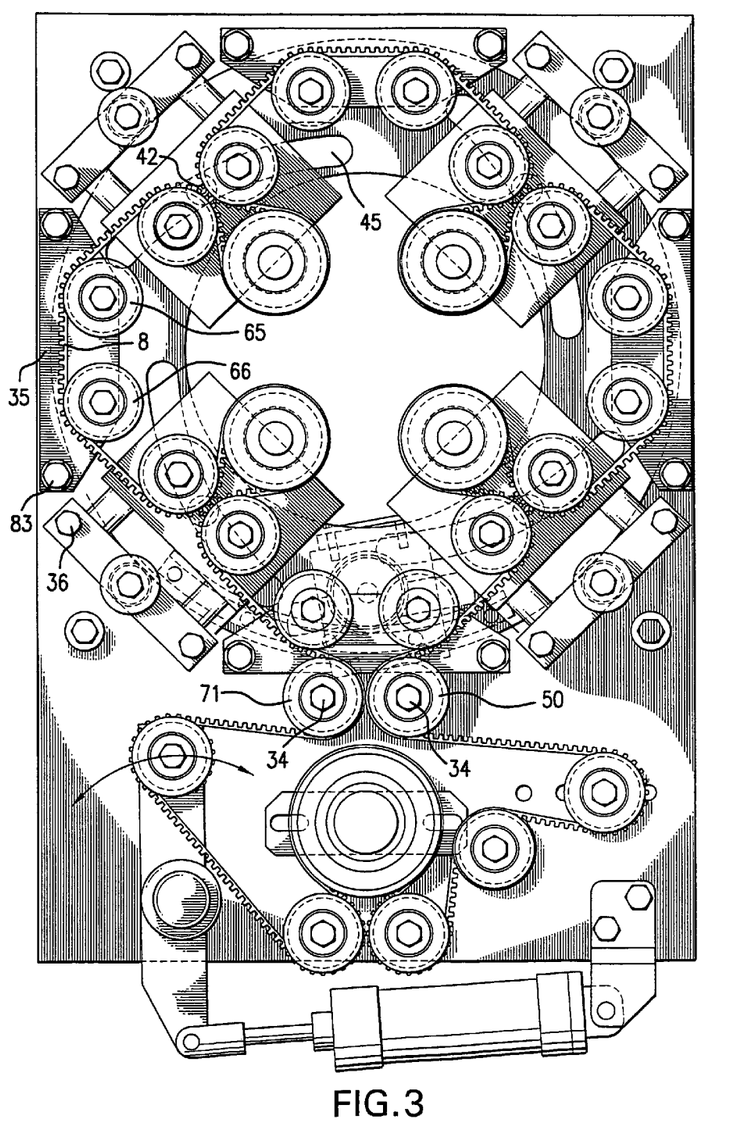
FIG. 3 is also a full front view of a drive end of a lip rolling machine equipped with a device of this invention in a fully open position that leaves the greatest distance from the centered axis of curling screws that is used to clarify additional components of the device.

With reference to FIG. 2, shown above the main drive pulley 7 are two guide pulleys, 71 and 50 of the drive system, and it should be understood that there is a series of such guide pulleys, all of which are similarly constructed and mounted. With reference to FIGS. 2 and 3, there is shown the idler pulleys 70 and 51. The idler pulleys are mounted on mounting plates 35 which are mounted on posts 83, which are in turn rigidly mounted to the exit plate 6. The rigidly mounted adjuster pulley 72, it will be noted from FIG. 2, is capable of being adjusted by the use of holes 13 through the exit plate 6. The rigidly mounted adjuster pulley 72 is affixed to the exit plate 6 by a fastening device such as a bolt 12, so that it can be removed and moved throughout the series of holes 13 for adjustment purposes.

Not easily visible from FIG. 1 and with reference to FIGS. 2 and 3, there is showing the distally mounted adjusting pulley 48, which is mounted on the swing bar 15 at the distal point 16 thereof. This mechanism is part of the tautness adjusting mechanism for the main drive belt 8, and consists of, in addition to the swing bar 15, and a distally mounted adjusting pulley 48, a drive mechanism 18 for the swing bar 15, the drive mechanism 18 can be powered with a gas, such as air, or can be hydraulically driven, the components parts of which are not shown therein as not critical to the invention. The distal end 24 of the drive mechanism 18 is rotatably anchored to the exit plate 6 through an attachment means 25. The drive rod 19 of the drive mechanism 18 has an attachment means 20 at its near end 21, which attachment means 20 is used to rotatably attach the swing bar 15 to the drive rod 19. On the median point 22 of the swing bar 15 is a means for rotatably attaching the median point 22 of the swing bar 15 to a post 23, which anchors the swing bar 15 to that position, but allows for a partial rotation of the swing bar 15 to accommodate the movement of the drive rod 19. In this manner, when the main drive belt 8 is mounted on the distally mounted adjusting pulley 48, the tautness of the main drive belt 8 can be adjusted and maintained.

Referring now to the upper portion of the exit plate 6 there is shown mounting posts 30, which are rigidly attached to the front surface 31 of the exit plate 6 and which have surmounted on them, rotatable support pulleys 32, which are used to support the single circular cam plate 33. The rotatable support pulleys 32 are configured such that the circular cam plate 33 sits down inside the center of the support pulleys 32 so that the circular cam plate 33 cannot jump out of the support pulleys 32 during use. The circular cam plate 33 is comprised of a single unitary structure that is configured with a large centered opening 44. By large, what is meant is that the opening 44 must be large enough to allow for the movement of the slidable elements of the pocket cassettes 37 back and forth within the centered opening 44, which slidable elements are discussed infra. The circular cam plate 33 also has a center axis 43 running through the center of the opening 44 and exiting through the centered opening of the second circular cam plate 91 (FIG. 1) located on the opposite end of the lip rolling cassette 92, which second circular cam plate 91 will be discussed infra. The circular cam plate 33 also has regularly spaced, semi-circular openings 45 (FIG. 3) through it which accommodates the perpendicular roller bearing pins 42 therein. This accommodation allows the perpendicular roller bearing pin 42 to slide therein along the configuration of the semi-circular openings 45 to assist in and participate in the adjustment of the curling screws of the machine In addition, there are also mounting posts 34 rigidly attached to the front surface 31 of the exit plate 6, upon which are further surmounted a set of guide pulleys 71 and 50. There are also present mounting posts 83 rigidly attached to the front surface of exit plate 6, upon which are further surmounted a mounting plate 35. Rigidly surmounted upon the mounting plate 35 are idler pulleys 65 and 66.

Figure 4:
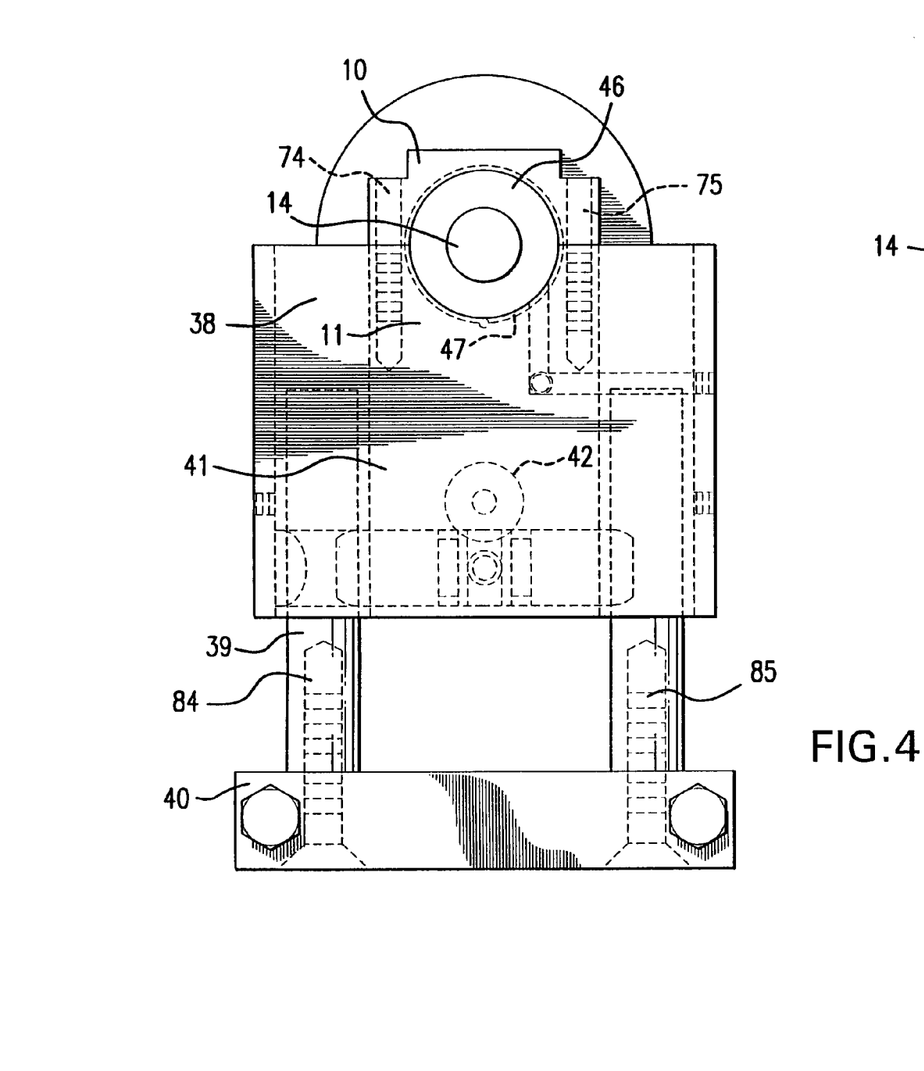
FIG. 4 is a full front view of a pocket cassette for the device of the delivery end of the device of this invention in the full closed position.
Figure 5:
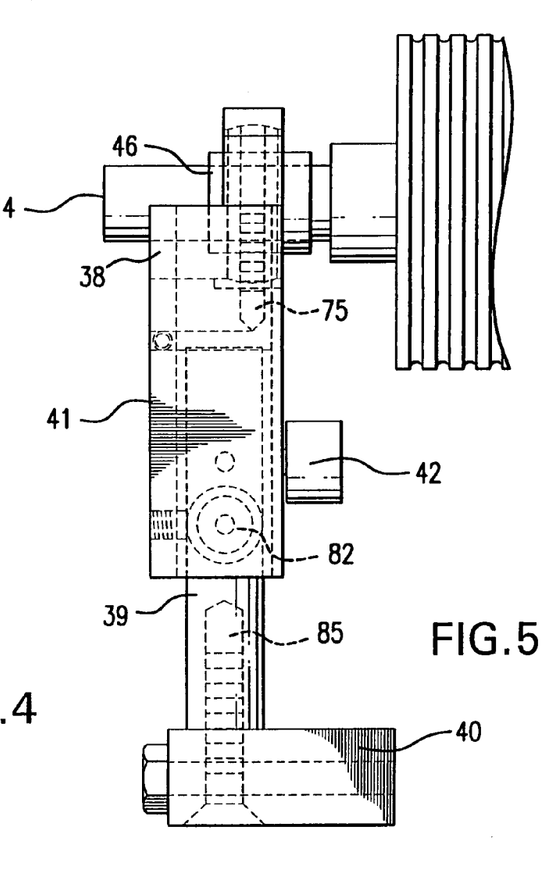
FIG. 5 is a side view of a pocket cassette.
Figure 6:
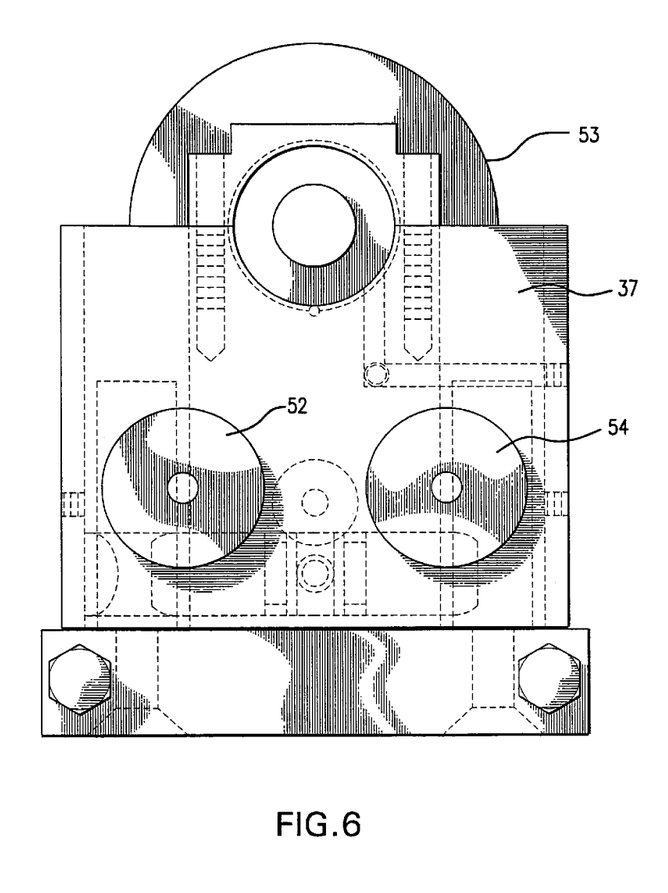
FIG. 6 is a full view of a pocket cassette of the drive end of the device of this invention in the full open position.
Figure 9:
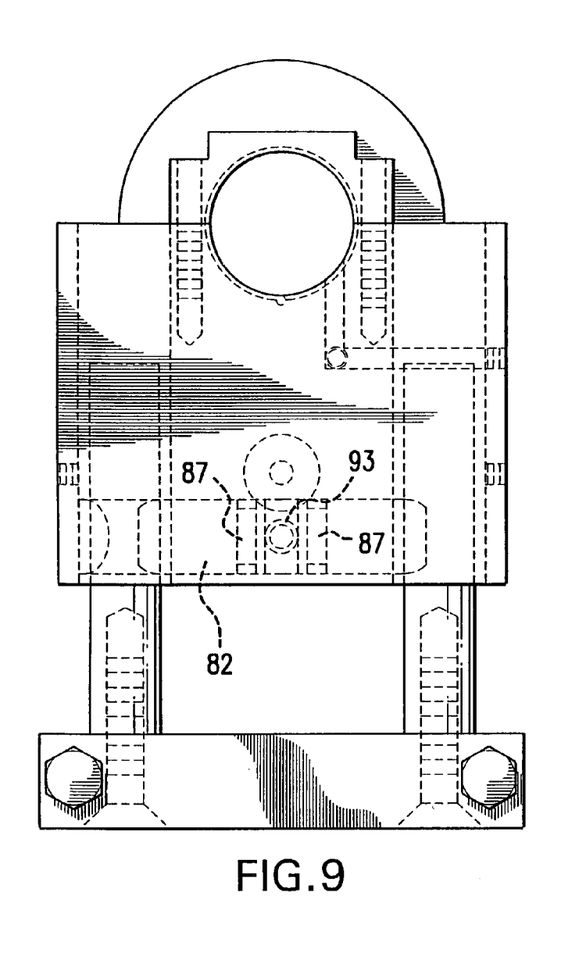
FIG. 9 is a front of the braking system.

There is yet another mounting post 36, which is rigidly attached to the front surface 31 of the exit plate 6, which is used to support the pocket cassettes 37 of this invention. FIGS. 4, 5 and 6 show the detail of a pocket cassette 37 (FIG. 2) with various components in detail. Each such pocket cassette 37 is essentially the same in construction and is similarly situated with regard to the mounting of it, and in FIGS. 2 and 3, the location of the pocket cassettes 37 can be observed. Each pocket cassette 37 is comprised of two pieces 38 and 40 that are slidable with regard to each other, in that the end 38 of the pocket cassette 37 that is most internal to the device is slidable along rails 39 of the opposite end 40 of the pocket cassette 37. Each slidable rail 39 is rigidly attached to the opposite end 40 of cassette pocket mount 37 by the pocket cassette rail attachments 84 and 85. Mounted on the top surface 41 of the end 38 is a roller bearing pin 42 that is perpendicular to the surface 41. As indicated supra, this perpendicular roller bearing pin 42 is insertable in the semi-circular opening 45 of the circular cam plate 33 and moves within it when the curling screws are to be adjusted. Attached to the opposite end of 40 is the end of pocket cassette cap 10. The opposite end of the pocket cassette cap is 11 within the end of pocket cassette cap 10 and the opposite end 11 is a bore 14, within the bore 14 is a bearing 46. Within the bearing 46 rests the end of the curling screw 47. The opposite end of pocket cassette cap 11 has two fastening devices 74 and 75 that connect it to the end of pocket cassette cap 10. Internal to the end of the pocket cassette 38 is a braking system 93 (FIG. 9). This internal braking system is used to symmetrically lock the position of the pocket cassette 37 against the rails 39 before and after the pocket cassette 37 has been adjusted. Pressure is exerted on the system forcing the brake plunger(s) 82 (FIG. 5) against the slidable rails 39 of opposite end 41. This locks the position of all of the pocket cassettes 37 so all of the containers rims are of a consistent configuration.

Figure 7:
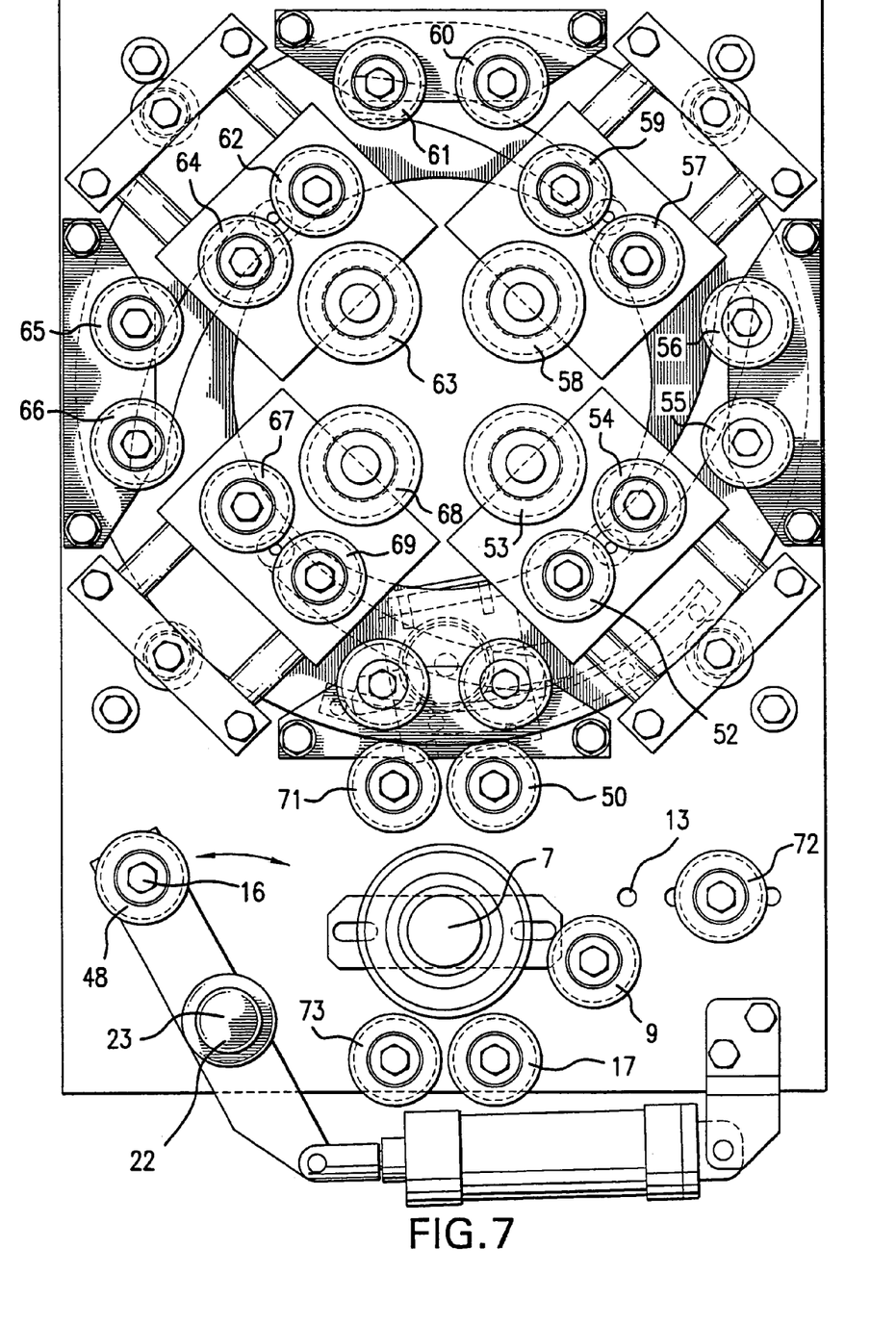
FIG. 7 is a full front view of single belt system and drive belt with pulley system.

FIGS. 6 and 7 shows that there is also a set of two carrier pulleys 52 and 54 mounted on the pocket cassette 37, which carrier pulleys 52 and 54 are intended to provide a means of carrying the single drive belt 8 from a idler pulley, for example 51, around the inside of a first carrier pulley, for example 52, around the outside of the lip roller drive wheel, for example 53, around the inside of the second carrier pulley, for example, 54 to an idler pulley, for example 55.

In addition, there is one set of guide pulleys designated 50 and 71 and a set of idler pulleys 70 and 51, wherein the numbers 70 and 51 designate the upper idler pulleys, and the number 71 and 50 designate the lower guide pulleys, that are mounted on the front surface 31 of the exit plate 6, and below the carrier pulleys 69 and 52, the purpose of which is to guide the single drive belt 8 from the median mounted adjusting pulley 48 and the rigidly mounted adjusting pulley 72 to the remainder of the pulleys in the system.

The single drive belt 8 is mounted in the following fashion, and with reference to FIGS. 2, 3 and 7, and beginning with the top of the main drive pulley 7, down and around the guide pulley 17, around the inside of guide pulley 9, around the outside of the rigidly affixed adjuster pulley 72, inside the guide pulley 50, around the outside of the idler pulley 51, around the inside of a first carrier pulley 52, around the outside of the first curling screw wheel 53, inside the second carrier pulley 54, around the outside of the idler pulley 55 and idler pulley 56, around the inside of the third carrier pulley 57, around the outside of the second curling screw wheel 58, around the inside of the fourth carrier pulley 59, around the outside of the idler pulley 60 and idler pulley 61, around the inside of the fifth carrier pulley 62, around the outside of the third curling screw wheel 63, around the inside of the sixth carrier pulley 64, around the inside of the idler pulley 65 and idler pulley 66, around the inside of the seventh carrier pulley 67, around the outside of the fourth curling screw wheel 68, around the outside of the eighth carrier pulley 69, around the outside of the idler pulley 70, around the inside of the guide pulley 71, around the outside of the distally mounted adjusting pulley 48, around the outside of the guide pulley 73, and up to the top of the main drive pulley 7 to complete the circuit of drive belt 8. It should be understood that each of the pulleys named above, along with the drive wheels are all aligned in the same plane so that the travel of the drive belt 8 is uniform.

Figure 8:
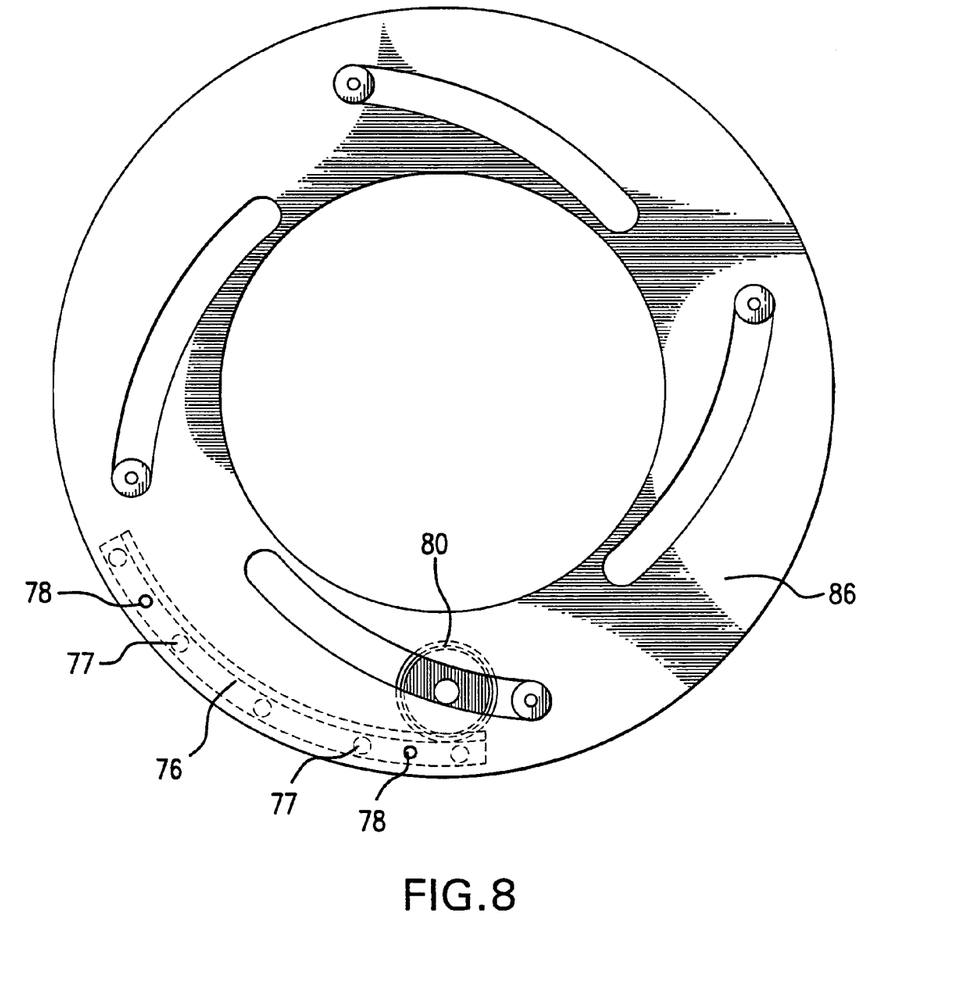
FIG. 8 is a full view of the front of the circular cam plate of a device of this invention in the full open position.

Turning to FIG. 8, featuring the front view of the cammed plate 33 in the full open position, there is attached to the front surface of the cammed plate 86, a channeled gear track 76 that facilitates the engagement and movement of the cammed plate 33. The channeled gear track 76 is attached at attachment locations 77. There are also present dowel holes 78 in the channeled gear track 76. Also present is the cam plate gear 80.

Figure 10:
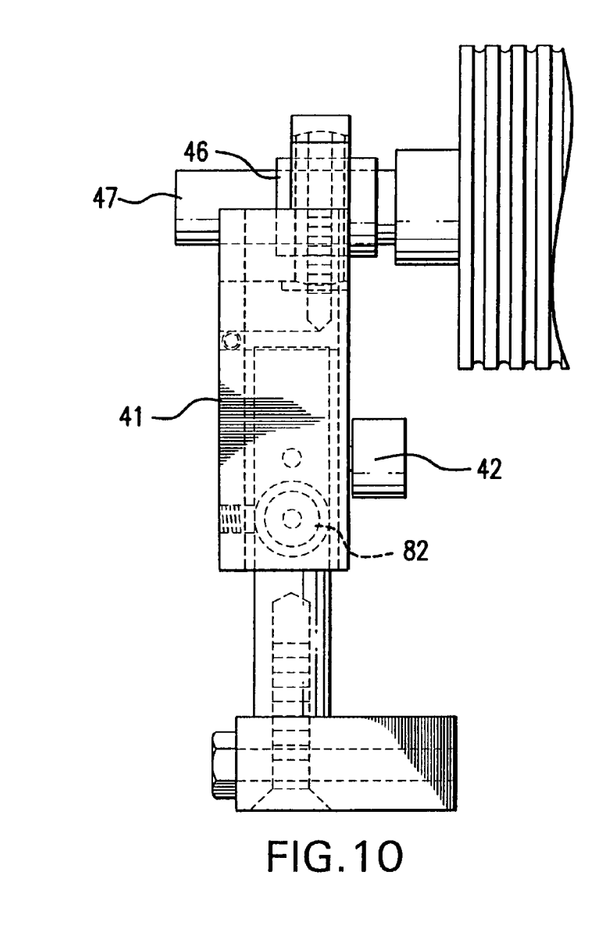
FIG. 10 is a side view of the braking system of FIG. 9 and in addition, there is shown an arbor, a bearing and the end of a curling screw.

FIGS. 9 and 10 show the approximate location of the brake plungers 82 that are incorporated within the pocket cassettes 37. The hydraulic seals 87 are also present internally of pocket cassette 37. The braking system 93 systematically holds the pocket cassette 37 at a predetermined position before and after the adjustment. Also shown is the top surface of 38 which is 41. The perpendicular roller bearing pin is also shown in perspective. A side view of the association of the of the pocket cassette 37 with the bearing 46 and the arbor 47.

What is claimed is:

1. An adjustable curling screw mechanism for a lip rolling machine adapted to form a rolled lip on the rim of a container by means of said curling screw mechanism, said curling screw mechanism comprising:
   a. a plurality of curling screws arranged about a circular space about a center axis, each curling screw rotated to carry out said forming, each curling screw formed with a helical groove engaging said container rim and progressively forming a lip as said container is axially advanced between said curling screws by rotation thereof;
   b. a mounting for each curling screw for enabling selective adjusting movement causing a selective increase or decrease of the radius of said spacing circle to enable adaptation to different sized containers;
   c. said mounting including means for causing simultaneous radial adjusting movement of said curling screws together while maintaining the location of said center axis of said spacing circle; and a selectively operable adjuster acting on all of said curling screws simultaneously to cause said simultaneous movement of the curling screws, said curling screw mechanism comprising a curling screw mounting comprising a series of pocket cassettes each carrier a respective curling screw, each said pocket cassette having surmounted thereon a rotatable pulley and a perpendicular roller bearing pin, said series of pocket cassettes linked together by a single drive belt associated with each rotatable pulley to provide a drive means for each curling screw in association with a motorized drive pulley; said operable adjuster for the curling screws comprising:
      a single circular cam plate having an outer edge, a center axis, a large centered opening, and a plurality of configured openings through said cam plate, said circular cam plate being rotatably held in place by a plurality of rotatable support pulleys at the outer edge thereof such that each perpendicular roller bearing pin of each pocket cassette is moveably held in a configured opening;
      said cam plate having a back surface and a lower edge, and attached to said back surface near the lower edge, a channeled track, said channeled track having a configured bottom in the channel;
      a drive mechanism, said drive mechanism comprising a gear box containing a gear drive mechanism, the gear drive mechanism having a shaft driven by said drive mechanism, said shaft having a distal end and affixed to the distal end of said shaft, a drive wheel, the drive wheel having an outside edge, said outside edge having a configuration that is accommodated by the configuration in the bottom of the channel of the track such that the wheel moves in the track and moves the circular cam plate accordingly; a means for adjusting the tautness of the single drive belt that links the pocket cassettes.

2. The curling screw mechanism as claimed in claim 1 wherein there are 4 curling screws present in the device.

3. The curling screw mechanism as claimed in claim 1 wherein there are 3 curling screws present in the device.

4. The curling screw mechanism as claimed in claim 1 wherein each pocket cassette slides inwardly towards the center axis and outwardly away from the center axis when force is applied to the perpendicular roller bearing pin of the pocket cassette to produce equal increments of radial motions of the curling screws with respect to said spacing circle center axis, whereby all of said curling crews move radially, simultaneously, in equal increments.

5. The curling screw mechanism as claimed in claim 1 wherein the rotatable pulley of each pocket cassette is coaxially aligned with the motorized drive pulley such that any adjustment of the curling screws does not negatively affect the single drive belt.

6. The curling screw mechanism as claimed in claim 1 wherein the means for adjusting the tautness of the single drive belt comprises a series of idler pulleys for each pocket cassette and at least one belt adjustment device comprising:
   a reciprocal drive means having a near end and a distal end and having a drive rod having a near end and a distal end, the near end of the reciprocal drive means being rotatably attached to a solid substrate, the distal end of the reciprocal drive means holding the drive rod, said drive rod having an attachment means at the distal end thereof;
   a swing bar having a near end, a distal end and a median point, the distal end of the drive rod being attached to the near end of the swing bar by the drive rod attachment means, the distal end of the swing bar being rotatably attached to a pivot post;
   there being a rotatable pulley mounted at the median point of the swing bar to accommodate the single drive belt, such that the single drive belt can be tightened or loosened by increasing the length of the drive rod from the distal end of the drive means, said lengthening of the drive rod driving the median mounted rotatable pulley away from the nearest attachment of the single drive belt from an idler pulley, while rotating the swing bar on the pivot post, thereby tightening the single drive belt, and loosening the single drive belt by shortening the drive rod to the distal end of the drive means.

7. The curling screw mechanism as claimed in claim 1 wherein there is also provided a measuring device to determine the precise position of the single circular cam plate.

8. The curling screw mechanism as claimed in claim 1 wherein there is also provided a braking mechanism for each pocket cassette that will hold the pocket cassette at a predetermined position after adjustment.

9. The curling screw mechanism as claimed in claim 1 wherein device is mounted to a lip rolling machine.

10. The curling screw mechanism as claimed in claim 1 wherein the device is a part of a system that is interchangeable to accommodate ranges in container size and diameter.

11. The curling screw mechanism as claimed in claim 1 wherein the feed end and finish end diameter can be independently adjusted of one another.

12. The curling screw mechanism as claimed in claim 1 wherein the feed end and finished end are not of equal diameters.

* * * * *